United States Patent [19]

Becker

[11] Patent Number: 4,934,773
[45] Date of Patent: Jun. 19, 1990

[54] MINIATURE VIDEO DISPLAY SYSTEM

[75] Inventor: Allen Becker, Brookline, Mass.

[73] Assignee: Reflection Technology, Inc., Waltham, Mass.

[21] Appl. No.: 78,295

[22] Filed: Jul. 27, 1987

[51] Int. Cl.$^5$ .............................................. G02B 26/10
[52] U.S. Cl. .................................... 350/6.6; 340/755; 250/578.1
[58] Field of Search ................... 350/6.3, 6.5, 6.6, 6.7, 350/6.8, 6.9, 6.91, 169, 486; 250/234, 235, 236, 578, 571, 237 G; 340/755, 812, 814; 351/209

[56] References Cited

U.S. PATENT DOCUMENTS

| | | |
|---|---|---|
| Re. 28,847 | 6/1976 | Vizenor . |
| 3,059,519 | 10/1962 | Stanton . |
| 3,170,979 | 2/1965 | Baldwin et al. . |
| 3,205,303 | 9/1965 | Bradley . |
| 3,671,766 | 6/1972 | Howe . |
| 3,742,238 | 6/1973 | Hoffman, II . |
| 3,760,181 | 9/1973 | Daly et al. . |
| 3,781,559 | 12/1973 | Cooper et al. . |
| 3,833,300 | 9/1974 | Rymes . |
| 3,923,370 | 12/1975 | Mostrom . |
| 3,958,235 | 5/1976 | Duffy . |
| 4,026,641 | 5/1977 | Bosserman . |
| 4,081,209 | 3/1978 | Heller et al. . |
| 4,225,862 | 9/1980 | Johnson ............................ 340/755 |
| 4,248,495 | 2/1981 | Minoura . |
| 4,251,126 | 2/1981 | Minoura et al. ..................... 350/6.6 |
| 4,340,888 | 7/1982 | Seroskie . |
| 4,439,157 | 3/1984 | Breglia et al. ......................... 434/40 |
| 4,443,075 | 4/1984 | Crane ................................. 351/209 |
| 4,457,580 | 7/1984 | Klose . |
| 4,470,044 | 9/1984 | Bell . |
| 4,477,727 | 10/1984 | Rud ................................. 250/237 G |
| 4,538,181 | 8/1985 | Taylor . |
| 4,632,501 | 12/1986 | Glynn . |
| 4,636,866 | 1/1987 | Hattori . |
| 4,676,582 | 6/1987 | Kato et al. ........................... 350/6.5 |
| 4,750,486 | 6/1988 | Butler et al. .......................... 350/486 |

OTHER PUBLICATIONS

Title "High-Resolution Display Using Light-Emitting Diode Arrays", vol. 52, pp. 46-51, by Ichimatsu Abiko and Akira Nomura, Jan./86.
Title "IRTV-445 Patented Scanning System".
*IBM Technical Disclosure Bulletin,* vol. 22, No. 1, Jun. 1979, "Projected Image Display", N. M. Leon.
Reid, D. A. T., "Micro-Display", 6/79, IBM Technical Disclosure Bulletin, vol. 22, No. 1, pp. 362-365.
Upton, Hubert W. and Goodman, James R., "Eyeglass Heads-Up Display", SID 81 Digest, pp. 48, 49.
Upton, Hubert W. and Goodman, J. R., "Eyeglass Heads-Up Display", Proceedings of the SID, vol. 23/2, 1982, pp. 77-80.

*Primary Examiner*—Bruce Y. Arnold
*Assistant Examiner*—Loha Ben
*Attorney, Agent, or Firm*—Wolf, Greenfield & Sacks

[57] ABSTRACT

A miniature full-page video display which mounts at least one row of light-emitting elements such as LEDs, a magnifying lens, and a vibrating mirror in a light-tight box having an opening through which the mirror may be viewed. The LEDs are selectively illuminated at points in the travel of the vibrating mirror, resulting in rows of pixels being projected at selected points on the mirror to provide a two-dimensional image. Two or more rows of light-emitting diodes, each of a different color, may be adjacently mounted and selectively illuminated in a manner such that corresponding LEDs are projected on the same spot on the mirror, resulting in a color image. The light box may be a hand-held device or it may be mounted to glasses, a headband or a similar device, and the virtual image appearing at the mirror may be viewed directly through an opening in the box or through a suitable optical system.

45 Claims, 3 Drawing Sheets

MINIATURE VIDEO DISPLAY SYSTEM

This invention relates to display systems and more particularly to a miniature full-page video display system.

BACKGROUND OF THE INVENTION

Advances in solid state technology are continuously reducing the size of various electronic devices including computers and calculators. However, the size to which such device can be reduced has heretofore been limited by the size of the output display generally required in order to properly utilize such devices. Most miniature computers and related devices currently use as an output display a single row containing a limited number of matrices adapted for display of alphanumeric characters, such matrices being made up of light-emitting diodes, liquid crystals, or similar elements. Alternatively, where a full-page display is required, relatively large liquid crystal or similar flat-screen devices have been employed.

The former displays provide very little information, have low resolution, are not adapted for displaying graphics, and, particularly if liquid crystal elements are utilized, are difficult to view in low ambient light conditions. The devices are also not adapted for mounting so that the viewer may view the display without interrupting the user's normal vision.

The larger full-page flat-screen displays generally do not have particularly high resolution, still permit the viewing of only a limited amount of information, and are frequently difficult to view in low ambient light conditions. In addition, while smaller than a standard CRT monitor, these devices are still relatively bulky to carry or use. They are thus adapted for use with lap-top machines rather than pocket devices.

In some special applications, devices such as small headgear-mounted CRTs project an image through a suitable optical system to the user's field of vision. Such devices, sometimes referred to as heads-up displays, are relatively expensive and cumbersome and are therefore not adapted for general commercial use.

A need therefore exists for a miniature (i.e. pocket-sized) display which creates an apparent image of a full-sized, full-page video display, is relatively low cost, provides high resolution and can be viewed in any ambient light condition. Additionally, such a display can be adapted for viewing by no more than one eye so that the display can be viewed while at the same time maintaining normal vision.

A display of this type might be used whenever it was necessary to display full page of information with a pocket device. It could for example be utilized either as a miniature output device for a pocket-sized computer or as an output device from a modem for information provided from a central computer. It could also be utilized as a special purpose display in such applications as displaying information provided from a paging service, displaying stock market information to a broker or investor, either continuously such as a ticker tape, or selected information in response to a query, providing product and price information in the field to a salesman, providing output for a hand-held instrument such as an oscilloscope and the like. A miniaturized display of this type could also be mounted to glasses, a headband, or the like and used to provide data to pilots, tank operators, surgeons and others who require large amounts of alphanumeric or graphic information to perform a particular function while still being able to maintain substantially normal viewing. A related capability would be to provide a picture-phone capability with mobile telephones. A miniaturized display of this type would also be useful in applications where the user wishes to be able to view information without disturbing other people or having other people be able to see the information which is being viewed. A display device of this type would thus be useful in applications where the user wished to view a full-page display on an airplane or commuter train, at a library or at other public places where it is desirable that the display not be visible or distracting to others. Another application of a device of this type would be as a TV monitor which would be smaller and lighter than existing miniature TVs while providing a much larger effective screen, better resolution and easier viewing. Two such devices mounted to glasses or goggles to cover the user's full field of view could provide 3-D images useful for low-cost flight simulators or other applications.

SUMMARY OF THE INVENTION

In accordance with the above, this invention provides a miniature display system which utilizes a plurality of light-emitting elements aligned in a predetermined fashion to produce a row of display pixels. The light-emitting elements are preferably linearly aligned. The system also includes a mirror and a means for vibrating the mirror at a predetermined frequency. Imaging optics is also provided for creating a virtual image of desired size at the mirror. Depending on the relative positions of the light-emitting elements and the imaging optics, the image may appear at infinity or may appear at a shorter comfortable viewing distance. Finally, a means is provided for selectively illuminating the light-emitting elements at selected points in the vibration of the mirror. This permits successive rows of selectively illuminated pixels to be projected on the mirror. The vibrating frequency of the mirror is sufficiently high so as to provide a flicker-free image of the desired full-page display.

Two or more rows of light-emitting elements may be provided, the elements of each row projecting a different color. Means are provided for causing corresponding elements in each of the rows to be selectively illuminated in a manner such that they are projected at the same point on the mirror, permitting a desired colored image to be obtained.

For preferred embodiments, the light-emitting elements are light-emitting diodes, the outputs from which are passed through appropriate optics to the mirror.

The foregoing and other objects, features and advantages of the invention will be apparent from the following more particular description of preferred embodiments of the invention as illustrated in the accompanying drawings.

DETAILED DESCRIPTION

Figure 1:
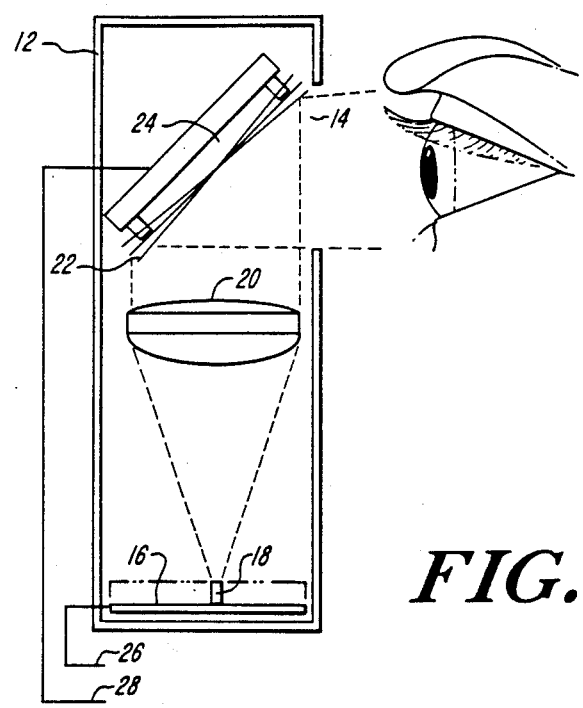
FIG. 1 is a conceptual diagram of the miniature display of a preferred embodiment of the invention.

Referring to FIG. 1, the display of this invention is packaged in a light-tight box 12 having a single opening 14 formed therein through which an image may be viewed. Box 12 is designed to be very small. For example, for one embodiment of the invention, the box would be 1-inch by 3-inches with a depth of 1.2 inches. Opening 14 would be a square hole for viewing the image, each side of the hole being approximately three-quarters of an inch.

Mounted in box 12 is a circuit 16 containing a plurality of linearly-aligned light-emitting devices 18. For a preferred embodiment, devices 18 are light-emitting diodes ("LEDs"). The number of diodes 18 in the linear array will depend on the width desired for the video display. For a preferred embodiment, with a 256×256 display, circuit 16 would contain 256 linearly-aligned LEDs. The LEDs for this embodiment are approximately 40 microns square with 20 microns space between LEDs. An example of a module suitable for use as the circuit 16 is the Telefunken TPMP8160 which is a 256 LED printing module.

Figure 2:
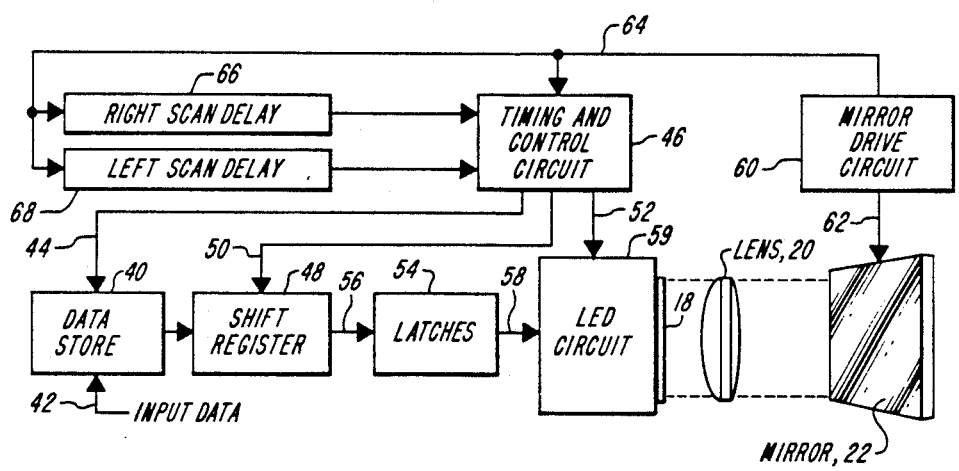
FIG. 2 is a schematic diagram of a miniaturized display of the type shown in FIG. 1.

Light from LEDs 18 is applied to the imaging optics which for the embodiment of FIG. 2 is a magnifying lens 20. A 30 mm diameter 50 mm focal length lens is suitable for such use. In accordance with well-known optical theory, lens 20 acts as a simple magnifier. Therefore, if LEDs 18 are located at, or near, the focal point of lens 20, the light emitted from LEDs 18 will be collimated by lens 20 as shown in FIG. 2. The collimated light output from lens 20 is applied to the vibrating mirror 22 of a resonant scanner 24. Scanner 24 may for example cause mirror 22 to vibrate through a scan angle of 10° peak to peak at a frequency in the range of 50 to 100 Hz. Vibration through a scan angle of 30° may be possible. Mirror 22 might for example be one inch square. As mirror 22 is vibrated, the point at which the light from LEDs 18 is projected on the mirror varies. Thus, by selectively illuminating various ones of the LEDs 18 at various points in the vibration of mirror 22, successive rows of pixels (i.e. display spots) will be caused to appear at the mirror. With the mirror being refreshed at a 100 Hz rate (since refresh occurs during movement of the mirror in both directions, the refresh rate is twice the vibration frequency of the mirror), the persistence of the user's eye is sufficient to eliminate flicker and create the illusion of a continuous full page virtual image at the mirror. With a system having the dimensions discussed above, the size of the virtual image at the mirror would be equivalent to a 12-inch diagonal CRT viewed at a distance of 24 inches from the eye. Thus, an image containing 32 lines of 5×7 matrix characters could be easily viewed. Optical scanners suitable for use in this invention are the IB series optical scanners available from General Scanning, Inc., 500 Arsenal Street, Watertown MA 02272.

The remaining elements in FIG. 1 are cables 26 and 28. Cable 26, as will be described in more detail hereinafter, carries control signals for the selective illumination of LEDs 18 and cable 28 provides power to resonant scanner 24 and receives synchronization information from the scanner.

Referring to FIG. 2, the information to be displayed is initially stored in data storage device 40. Depending on application, storage 40 may be a ROM, a PROM, an EPROM or a RAM. The read-only stores would be utilized in applications where a limited set of information is selectively provided to the user. However, for most applications, the information provided to the user will vary with time and environment and with the information the user requests or the information it is determined, either by the user's computer, a host computer, or a supervisory person that the user desires or needs. New information to be displayed may be applied to storage device 40 over data input cable 42 and may be stored in storage device 40 during the delays to be discussed hereinafter which occur at the end of each frame.

The address at which information is stored in storage device 40 and the address from which information is read out is controlled in conventional fashion by lines 44 from timing and control circuit 46. Data is read out from storage device 40 a row at a time into shift register 48 under control of signals on line 44 from circuit 46. Shift register 48 has for example 256 bit positions, there being a bit position in shift register 48 for each LED 18.

When it is desired to display the row of characters shifted into shift register 48, a strobe signal is applied by circuit 46 over line 50 to cause the contents of shift register 48 to be transferred into latches 54 over cable 56. The output of latches 54 on cable 58 controls the display drivers in LED circuit 59, the drivers being triggered by a signal on line 52 to illuminate LEDs 18. Once a row of bits has been transferred from shift register 48 to latches 54, signals may again be applied to lines 44 to load a new row of information into the shift register.

As previously discussed, the outputs from LEDs 18 are applied through lens 20 to form a display line of pixels at a selected vertical position on mirror 22. As viewed in FIG. 2, the user (not shown) would be inside the figure facing outward.

The vibration of mirror 22 is controlled by mirror drive circuit 60. The drive signal applied to mirror 22 over line 62 is generally sinusoidal so as to avoid sharp transitions in mirror motion. However, the sinusoidal vibration of mirror 22 results in the timing between adjacent rows at the mirror being nonlinear. In the discussion to follow, various techniques will be discussed for dealing with this nonlinearity.

While the drive of the mirrors is relatively linear in the regions between the two end points of mirror travel, the drive signal, and thus the mirror travel, in the regions near the end points is sufficiently nonlinear as to defy easy compensation. It has therefore been decided not to attempt to utilize the regions near the end points for display in preferred embodiments of the invention. This objective is achieved in the embodiment shown in FIG. 2 by applying the directional output signal on line 64 from drive circuit 60 to circuit 46 and to right-scan-delay circuit 66 and left-scan-delay circuit 68. The outputs from the scan delay circuits are applied as additional inputs to circuit 46.

Figure 3:
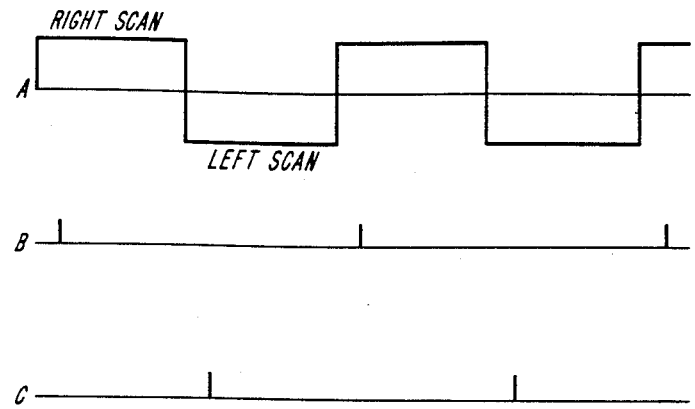
FIGS. 3 and 4 are timing diagrams illustrating the pulses appearing at various points in the circuit of FIG. 2.

Referring to FIG. 3, line A shows the signal which appears on line 64. This signal is high during the scan of the mirror in one direction, which will be called the right scan direction, and is low during a scan in the opposite direction, which will be called the left scan direction. The transitions in the signal on line 64 when the direction of vibration of mirror 22 changes may be utilized to synchronize timing control circuit 46 and thus the remainder of the system. It is further noted that points are being mapped onto mirror 22 during both the left scan and right scan of the mirror. However, the points are being mapped in opposite directions for these two scans. Thus, while points may for example be mapped starting at the top of the screen and proceeding row by row to the bottom of the screen during the right scan, during the left scan the first row generated would be the bottom row and rows would proceed to be generated from bottom to top. In order to maintain a clear, high resolution display, it is important that the same point always appear at exactly the same spot on the mirror during both the left scan and the right scan. This may necessitate that the delay before a right scan begins as controlled by delay 66 be different from the delay before the left scan begins as controlled by delay 68. This is the reason for the two separate scan delays. The output from right scan delay 66 is shown on line B of FIG. 3 as a series of pulses which occur slightly after the beginning of each right scan. Similarly, the output from left scan delay 68 is shown on line C of FIG. 3 and constitutes a series of pulses which are delayed slightly from the beginning of each left scan. As previously indicated, and as may be visible in FIG. 3, the delay for the left scan may be different from the delay for the right scan so as to assure that a point appears at precisely the same point during both scans.

Figure 4:
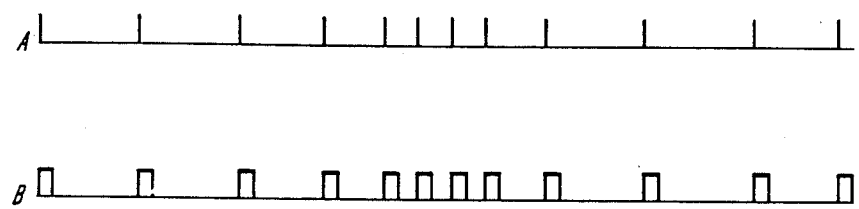

To further compensate for the nonlinearity in the mirror drive, the spacing between strobe signals on line 52, (which are utilized to load each row of bits into latches 54) may be varied during a given scan cycle as shown in FIG. 4A. Similarly, the spacing, but not the duration, of the display signals on line 52 which control the LED drivers may also be varied as shown on line B of FIG. 4. In FIG. 4, only representative ones of the strobe and display signals are shown, it being understood that there would be one of each such signal for each row of the display. Thus, for a 256×256 display, there would be 256 of each such signal. Another potential problem is that, with large light-emitting diode arrays, such as those utilized for the preferred embodiment of the invention, the illumination from the LED may not be uniform. While such nonuniformity may be acceptable for some applications, such nonuniformity could cause a vertical line or stripe to appear in the display in the application of this invention. Since manufacturers typically provide information concerning such nonuniformities with the arrays, such nonuniformities may be compensated for in the circuit of FIG. 2 either by varying the width of the pulses used to energize the LEDs, as shown on line B of FIG. 4, and thus the duration which the LEDs are on, or by varying the current applied to the LEDs to compensate for their nonuniformity. Either technique will result in a substantially uniform illumination from all LEDs of the array regardless of any initial nonuniformities.

In practice, shift register 48, latches 54 and LED circuit 59 may be included as part of circuitboard 16. Similarly, mirror drive circuit 60 may be included as part of optical scanner 24. Timing and control circuit 46 may be a programmed microprocessor or other suitable control device. The nature and programming of circuit 46 will vary with application.

Figure 5:
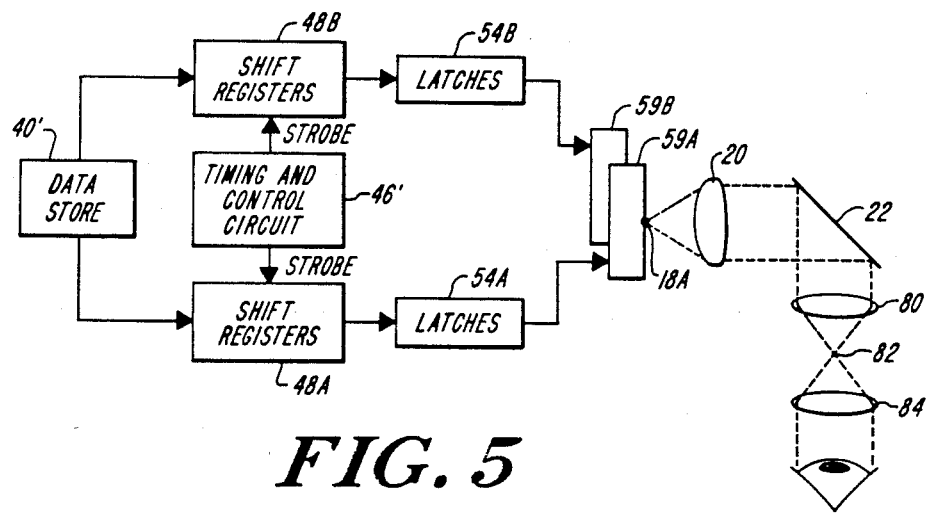
FIG. 5 is a schematic diagram of an alternative embodiment of the invention.

FIG. 5 is a schematic diagram of an alternative embodiment of the invention wherein, for purposes of illustration, two rows of light-emitting diodes 18A and 18B are shown, each of which provides an output in a different color. For example, light-emitting diodes 18A could provide a red output and light-emitting diodes 18B a green output. In order to provide a full-color display, one or more additional rows of light-emitting diodes might be provided. For each row of light-emitting diodes 18, there is a LED circuit 59, a set of latches 54 and a shift register 48. Data from data store 40' is loaded into shift registers 48 under control of timing and control circuit 46'. The same data would be loaded into both sets of shift registers but would be loaded into latches 54 for display at slightly different time intervals, the time intervals being correlated to the space between the rows of light-emitting diodes and the rate of travel of the vibrating mirror 22 such that corresponding outputs from light-emitting diodes 18A and 18B are imaged on exactly the same spot on mirror 22. Color images may thus be obtained at mirror 22.

FIG. 5 also illustrates another variation in the system in that, instead of the virtual image at mirror 22 being viewed directly through an opening in box 12, additional optics are provided to create an intermediate real image and then recollimate the light into a small enough beam so that maximum light goes into the user's eye. More particularly, the image from mirror 22 is passed through a lens 80 which forms an intermediate real image at point 82 which is then recollimated by lens 84. Lens 84 could, for example, be set in an eye piece which the viewer could look through.

Except for the two changes noted above, the embodiment of FIG. 5 operates in the same manner discussed previously in conjunction with the embodiment of FIG. 2.

Figure 6:
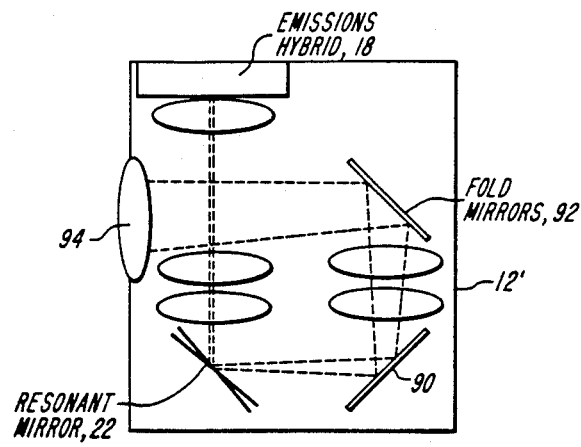
FIG. 6 is a diagram illustrating an optical configuration for a second alternative embodiment of the invention.

Depending on the desired size for the box 12 and the nature of the desired optical output, a variety of optical configurations may be utilized. FIG. 6 is an example of one such optical path which may be utilized to increase light available at the viewing lens. In this embodiment, light from the light-emitting diodes 18 passes through a series of lenses which form the imaging optics to mirror 22. The image from the mirror is projected by a pair of fold mirrors 90 and 92 and through various lenses to a viewing lens 94. As is seen in FIG. 6, the imaging lens, which may be a single lens as shown in FIG. 1, is preferably a multiple lens configuration. The exact nature of this lens configuration will vary with application. Further, while for preferred embodiments, magnifying lens means have been utilized for the imaging optics, imaging optics could be used which create the virtual image at any comfortable viewing distance and at any desired size and could be formed either in whole or in part by curved mirrors or other optical elements in addition to or instead of lenses.

Power to run the various embodiments of the invention indicated above would typically be obtained from batteries (not shown). If for the particular application, the power demands are sufficiently low that miniature batteries can be utilized, the batteries can be mounted within the device itself. If larger batteries are required, such batteries could be in a battery pack which the user could, for example, clip to his waist, which pack would be attached through a suitable cable or wire to the device, or it could take some other conventional form. Similarly, a cable or wire could be provided connecting circuit 46 as well as store 40 to an external computer or other control device, permitting both the programming of the display and the data to be displayed, to be varied.

Another possible configuration which would reduce wire bonds is for the LEDs to be driven from a driver matrix rather than having a separate driver for each LED. This would reduce the time slot for each LED and would result in other changes in the circuitry appropriate for such configurations.

While for purposes of illustration, a display of 256×256 has been indicated, it is within the contemplation of the invention that either higher or lower resolution be provided in either direction. It is also possible for the display to be rectangular rather than square. The components of the system may also be arranged so that the linear array of LEDs represents a vertical column of the display rather than a horizontal row and successive columns of the display are produced as the mirror is vibrated. In addition, while LEDs have been utilized as the light-emitting elements for preferred embodiments, other light-emitting elements, such as linear electroluminescent strips, may be utilized in some applications. It is also within the contemplation of the invention that the LEDs or other light-emitting element be aligned in some predetermined fashion other than as a single horizontal or vertical row. For example, the elements could be interlaced in two rows, could be at an angle, or, for appropriate applications could be in a curve, wave array, or other form. The electronics would assure generation of a desired image regardless of the element configuration.

Further, the box 12 may either be a hand-held box which could for example be placed in the user's pocket, or easily fit in a briefcase or purse when not in use, or it could be a small box adapted to be mounted on glasses or goggles for viewing by the user while keeping his hands free. In the latter configuration, since the display is adjacent to only one eye of the user, and could be positioned out of the user's main line of vision for such eye, it is possible for the user to monitor the display with minimal interruption of the user's normal vision. Thus, the display is adapted for use by pilots, machine operators, tank drivers, surgeons or others who require many forms of data input while performing their normal functions, and may provide such information to the user in a form which would be less distracting from his normal function when attempting to view the various dials, gauges and monitors currently used for providing such information. The device could also be mounted so as to be movable to a position completely out of the user's line of vision when not in use. Such configuration might also permit business or professional people to assimilate required information while driving, sitting on a plane or commuter train, meeting with customers or clients, or performing other functions where it has not heretofore been possible to obtain information in this way. This can be accomplished in a form far more convenient and less bulky than with current lap-top machines and with a display which is far easier to see and read.

While for the preferred embodiments, only a single image has been provided to be viewed through one eye, it is within the contemplation of the invention to provide, for example, glasses having a separate lens 84 or 94 positioned in front of each eye for viewing slightly displaced images to give a 3-dimensional image. This could, for example, serve as a very inexpensive flight simulator or be utilized for other training functions.

It is also possible in some applications to eliminate data store 40 and to control the LEDs directly from a data or video input signal on line 42. For example, line 42 could be connected through suitable circuitry to a TV antenna or other video receiver, permitting the device to be used as a miniature TV monitor.

While the invention has been shown and described above with respect to various preferred embodiments, it will be apparent that the foregoing and other changes of form and detail may be made therein by one skilled in the art without departing from the spirit and scope of the invention.

What is claimed is:

1. A miniature display system having a size suitable for hand-held and headgear-mounted use for displaying a substantially planar, magnified image comprised of a plurality of illuminated picture elements viewable by a viewer's eye, said display system comprising:
   a plurality of light-emitting elements each of which can be independently illuminated, said light-emitting elements being aligned in a predetermined fashion;
   first imaging optics for creating an enlarged virtual image of said light-emitting elements;
   a mirror in which the reflection of said enlarged virtual image can be observed;
   means for repetitively moving said mirror through a predetermined range of movement; and
   means for selectively illuminating said light-emitting elements as said mirror moves, to create a substantially planar, two-dimensional, enlarged virtual image, said light-emitting elements, first imaging optics and said mirror being positioned relative to one another and relative to said viewer's eye so that substantially all of said virtual image can be simultaneously observed without requiring said display system to be moved relative to said viewer's eye and so that said imaging optics and said mirror are small enough for use in a hand-held and a headgear-mounted device.

2. The display system as claimed in claim 1, wherein said light-emitting elements are linearly aligned.

3. The display system as claimed in claim 1, wherein said light-emitting elements are aligned in a single linear row.

4. The display system as claimed in claim 1, wherein said light-emitting elements are aligned in at least a first linear row and a second linear row and said light-emitting elements in said first linear row are staggered in position with respect to light-emitting elements in said second linear row.

5. The display system as claimed in claim 1, further comprising second imaging optics for conveying said two-dimensional, enlarged virtual image to an observer's eye.

6. The display system as claimed in claim 1, further comprising second imaging optics which acts to enlarge the physical area in which the observer's eye may be located in order to view the entire image.

7. The display system as claimed in either of claims 5 and 6, wherein said second imaging optics comprises means responsive to said enlarged virtual image for creating a real image and said display system further comprises means for viewing said real image.

8. The display system as claimed in claim 1, wherein light emitted from said light-emitting elements follows an optical path between said light-emitting elements and an observer and said display system further comprises passive optical means for folding or redirecting said optical path.

9. The display system as claimed in claim 1, wherein said light-emitting elements are light-emitting diodes.

10. The display system as claimed in claim 1, including means for correcting for non-uniform brightness across said planar, two-dimensional, enlarged virtual image.

11. The display system as claimed in claim 10, wherein said correcting means comprises timing means for generating electrical pulses and means for providing said electrical pulses to each of said light-emitting elements, said light-emitting elements emitting light in response to said electrical pulses and means controlled by said timing means for adjusting the length of time during which said electrical pulses are applied to said light-emitting elements.

12. The display system as claimed in claim 10, wherein said correcting means comprises timing means for generating electrical pulses and means for providing said electrical pulses to each of said light-emitting elements, said light-emitting elements emitting light in response to said electrical pulses and means controlled by said timing means for adjusting the amplitude of said electrical pulses.

13. The display system as claimed in claim 1, wherein some of said plurality of light-emitting elements emit a first color and some of said plurality of light-emitting elements emit a second color different from said first color; and
   wherein said means for selectively illuminating is operative to illuminate said light emitting elements in a manner such that different colored light emitted from said plurality of elements appears at the same point on the mirror so that a desired colored image is generated.

14. The display system as claimed in claim 1, wherein said moving means rotates said mirror about a fixed axis.

15. The display system as claimed in claim 14, wherein said moving means reciprocates said mirror about a fixed axis with a nonlinear motion.

16. The display system as claimed in claim 15, wherein said nonlinear motion is a substantially sinusoidal motion and said display system further comprises means responsive to the motion of said mirror and operative at the ends of the travel of said mirror for inhibiting said light-emitting elements from emitting light for a predetermined time period.

17. The system as claimed in claim 16, further comprising timing means for generating electrical pulses and means for providing said electrical pulses to each of said light-emitting elements, said light-emitting elements emitting light in response to said electrical pulses and means controlled by said timing means and responsive to the motion of said mirror for adjusting the time relative to said mirror motion at which said electrical pulses are applied to said light-emitting elements so that nonlinearity in the movement of the mirror is compensated.

18. The display system as claimed in claim 17, comprising means for entering new images to be displayed in said means for storing.

19. The display system as claimed in claim 1, wherein said mirror moves through a predetermined path and subsequently retraces said path in the opposite direction and wherein said illuminating means is responsive to the direction of mirror motion for illuminating said light-emitting elements so that the same planar, two-dimensional, enlarged virtual image is created during both directions of mirror motion.

20. The display system as claimed in claim 1, comprising means for storing at least one image to appear at the mirror; and
   means for selecting the image to appear.

21. The display system as claimed in claim 1, comprising means for entering images to appear at said mirror; and
   means for utilizing the input from said images entering means for controlling said illuminating means.

22. A display system as claimed in claim 1, comprising a light-tight box having a viewing opening formed therein; and
   means for mounting said light-emitting elements, said mirror, said moving means, and said imaging optics in said box.

23. The display system as claimed in claim 22, comprising means for mounting said light-tight box within a viewer's field of vision.

24. The display system as claimed in claim 23, comprising a second light-tight box and means for mounting each of the light-tight boxes adjacent a different eye of the viewer to generate a stereo display.

25. The display system as claimed in claim 22, comprising means for mounting said light-tight box physically adjacent one eye of the viewer.

26. The display system as claimed in claim 1, further comprising means for applying slightly different images to the elements of each of said light-tight boxes whereby a 3-D image is projected onto the viewer.

27. The display system as claimed in claim 1, wherein said moving means comprises a resonant mirror rotating system.

28. The display system as claimed in claim 1, further comprising means for applying video signals to said illuminating means and wherein said illuminating means comprises timing means for generating electrical pulses and means for providing said electrical pulses to each of said light-emitting elements, said light-emitting elements emitting light in response to said electrical pulses and means controlled by said timing means and responsive to said video signals for adjusting the time duration of said electrical pulses to generate video images.

29. The display system as claimed in claim 1, further comprising means for applying video signals to said illuminating means and wherein said illuminating means comprises timing means for generating electrical pulses and means for providing said electrical pulses to each of said light-emitting elements, said light-emitting elements emitting light in response to said electrical pulses and means controlled by said timing means and responsive to said video signals for adjusting the amplitude of said electrical pulses to generate video images.

30. A miniature display system having a size suitable for hand-held and headgear-mounted use for displaying a substantially planar, magnified image comprised of a plurality of illuminated picture elements viewable by a viewer's eye, said display system comprising:
   a plurality of light-emitting elements each of which can be independently illuminated, said light-emitting elements being aligned in a predetermined fashion;
   first imaging optics for creating an enlarged virtual image of said light-emitting elements;
   a mirror in which the reflection of said enlarged virtual image can be observed;
   means for repetitively moving said mirror through a predetermined range of movement;
   means for selectively illuminating said light-emitting elements as said mirror moves, to create a substantially planar, two-dimensional, enlarged virtual image; and
   means for mounting said first imaging optics relative to said mirror and said light-emitting elements and for mounting said mirror to bring said mirror close enough to said viewer's eye so that substantially all of said virtual image can be simultaneously observed without moving said display system relative to said viewer's eye and without the use of telescopic optics between said mirror and said viewer's eye and so that said imaging optics and said mirror are small enough for use in a hand-held and a headgear-mounted device.

31. The display system as claimed in claim 30, wherein said first imaging optics comprises at least one lens.

32. A miniature display system for displaying a substantially planar, magnified image comprised of a plurality of illuminated picture elements viewable by a viewer's eye, said display system being of an overall size suitable for hand-held use and comprising:
  a plurality of light-emitting elements each of which can be independently illuminated to generate an illuminated pixel dot, said light-emitting elements being linearly aligned in at least one row;
  first imaging optics for creating an enlarged virtual image of said at least one row of light-emitting elements, said imaging optics including a lens system having a maximum dimension for imaging the light generated by said light-emitting elements;
  a planar mirror having a maximum dimension in which the reflection of said enlarged virtual image can be observed;
  means for resonantly oscillating said mirror about a fixed axis through a predetermined range of movement; and
  means responsive to the motion of said mirror for selectively illuminating the light-emitting elements so that a plurality of images of said light-emitting elements of said at least one row are generated at physically displaced points and a substantially planar, two-dimensional, enlarged virtual image is created, said light-emitting elements, said first imaging optics and said mirror being mounted relative to one another so that when said viewer's eye is positioned near said mirror, substantially all of said enlarged virtual image can be directly and simultaneously observed without moving said display system relative to said viewer's eye and so that said lens system maximum dimension and mirror maximum dimension are small enough to incorporate said lens system and said mirror in a held held and a headgear-mounted device.

33. The display system as claimed in claim 32, wherein said light-emitting elements are aligned in at least a first linear row and a second linear row and said light-emitting elements in said first linear row are staggered in position with respect to light-emitting elements in said second linear row.

34. The display system as claimed in claim 32, wherein light emitted from said light-emitting elements follows an optical path between said light-emitting elements and an observer and said display system further comprises passive optical mirrors for folding or redirecting said optical path.

35. The display system as claimed in claim 32, wherein said light-emitting elements are light-emitting diodes.

36. The display system as claimed in claim 35, including means for correcting for non-uniform brightness across said planar, two-dimensional, enlarged virtual image.

37. The display system as claimed in claim 36, wherein said correcting means comprises timing means for generating current pulses and means for providing said current pulses to each of said light-emitting diodes, said light-emitting diodes emitting light in response to said current pulses and means controlled by said timing means and responsive to the motion of said mirror for adjusting the time duration of said current pulses so that the illumination interval for each row is equal.

38. The display system as claimed in claim 36, wherein said correcting means comprises timing means for generating current pulses and means for providing said current pulses to each of said light-emitting diodes, said light-emitting diodes emitting light in response to said current pulses and means controlled by said timing means for adjusting the amplitude of said current pulses so that the brightness of light emitted by said light-emitting diodes can be varied.

39. The display system as claimed in claim 32, wherein said mirror rotates in a first direction and then in a second direction which is reverse with respect to said first direction and said illuminating means is responsive to motion of said mirror for illuminating said light-emitting elements to create a first succession of images of said row of light-emitting elements in a first order when said mirror is moving in said first direction and for illuminating said light-emitting elements to create a second succession of images in a second order reverse to said first order so that the same planar, two-dimensional, enlarged virtual image is created during both directions of mirror motion.

40. A miniature display system according to claim 32, wherein said virtual image is comprised of at least 60,000 pixel dots.

41. A miniature display system according to claim 32, wherein said lens system has a focal length and said row of light-emitting elements has a length and the ratio of said focal length to said row length is such that substantially the entire row of light-emitting elements can be simultaneously observed without moving said display system relative to said observer's eye.

42. A miniature display system according to claim 32, wherein said range of mirror movement is such that substantially all of said enlarged virtual image can be simultaneously observed without moving said display system relative to said observer's eye.

43. A method for displaying an image, in a display system, directly viewable by a viewer's eye, said method comprising the steps of:
  A. selectively illuminating a plurality of light-emitting elements, said light-emitting elements being aligned in a predetermined fashion;
  B. projecting light emitted from said plurality of light-emitting elements through imaging optics having a focal length to create an enlarged virtual image of said light-emitting elements;
  C. reflecting said virtual image from a mirror;
  D. repetitively moving said mirror through a predetermined range of movement to create a two-dimensional display; and
  E. positioning said display system near enough to said viewer's eye so that substantially all of said two-dimensional display can be simultaneously observed without moving said display system relative to said viewer's eye.

44. A method for displaying an image directly viewable by a viewer's eye with sufficient resolution that a full page of alphanumeric text can be viewed in a display system having a size small enough for a held-held and headgear-mounted devices, said method comprising the steps of:

A. selectively illuminating an array of light-emitting elements, said light-emitting elements being aligned in a predetermined fashion, said array having sufficient length that an entire width of said image can be simultaneously displayed;

B. projecting light emitted from said array of light-emitting elements through imaging optics having a maximum dimension and a focal length to create an enlarged virtual image of said light-emitting elements;

C. reflecting said virtual image from a mirror having a maximum dimension;

D. repetitively moving said mirror through a predetermined range of movement to create a two-dimensional display;

E. positioning said mirror near said viewer's eye; and

F. adjusting the ratio of said focal length to said light-emitting elements array length so that substantially all of said two-dimensional display can be directly and simultaneously observed without moving said display system relative to said viewer's eye.

45. A method for displaying an image according to claim 44, further comprising the step of:

G. adjusting said predetermined range of mirror movement so that substantially all of said two-dimensional display can be directly and simultaneously observed without moving said display system relative to said viewer's eye.

* * * * *